United States Patent
Marsot

(10) Patent No.: US 7,042,990 B2
(45) Date of Patent: May 9, 2006

(54) METHOD FOR PARAMETRIZING THE GREETING MESSAGE OF A VOICE MAILBOX

(75) Inventor: Rodolphe Marsot, Gambetta (FR)

(73) Assignee: Cegetel Groupe, Paris la Defense Cedex (FR)

( * ) Notice: Subject to any disclaimer, the term of this patent is extended or adjusted under 35 U.S.C. 154(b) by 173 days.

(21) Appl. No.: 10/677,586

(22) Filed: Oct. 2, 2003

(65) Prior Publication Data

US 2005/0074099 A1    Apr. 7, 2005

(51) Int. Cl.
    *H04M 1/64* (2006.01)
(52) U.S. Cl. .................. 379/88.23; 455/413
(58) Field of Classification Search ........... 379/88.22, 379/88.23, 88.25, 88.26, 88.27, 88.28; 340/7.2; 455/412.1, 413, 414.1, 414.4

See application file for complete search history.

(56) References Cited

U.S. PATENT DOCUMENTS 6,252,517 B1 *   6/2001  Parvulescu et al. ......... 340/7.2
2002/0085700 A1   7/2002  Metcalf ................. 379/210.01
2002/0132612 A1 *  9/2002  Ishii ...................... 455/414
2003/0007625 A1 *  1/2003  Pines et al. ............... 379/223
2004/0146147 A1 *  7/2004  Picard et al. ............ 379/88.22
2004/0179658 A1 *  9/2004  Lowmaster et al. ...... 379/88.17
2004/0247093 A1 * 12/2004  Potts et al. ............. 379/88.17

FOREIGN PATENT DOCUMENTS

WO    WO 02/17650    2/2002
WO    WO 02/054743   7/2002

* cited by examiner

*Primary Examiner*—Fan Tsang
*Assistant Examiner*—Gerald Gauthier
(74) *Attorney, Agent, or Firm*—Perman & Green, LLP.

(57) ABSTRACT

A user produces (301) a vocal and/or video message on an apparatus provided with means for the recording of such a message. This message is packaged (302) in a multimedia configuration message. This configuration message also comprises an identifier of a user. This configuration message is sent (303) to a greeting message server that uses the identifier and the greeting message of the configuration message to update (307) a database of the server.

8 Claims, 2 Drawing Sheets

METHOD FOR PARAMETRIZING THE GREETING MESSAGE OF A VOICE MAILBOX

BACKGROUND OF THE INVENTION

1. Field of the Invention

An object of the invention is a method for parametrizing the greeting message of a voice mailbox.

The field of the invention is that of telephony and voice mail services. More particularly, the field of the invention is that of vocal answering machines used to take messages from callers when the called parties, who are subscribers to a mail service, cannot be contacted (or reached).

It is an aim of the invention to enable a user to parametrize/configure his greeting message by optimising the connection time of a terminal to the network.

It is another aim of the invention to enable voice messages to have image, video and/or text type information added to them.

2. Brief Description of Related Developments

In the prior art, there are known voice mail services such as those proposed by mobile telephony operators. When a subscriber with a mobile telephony operator is unreachable, a caller seeking to reach the unreachable user is automatically connected to a voice mailbox. This voice mailbox then puts out a greeting message, after which the caller can record a message. The connection to this voice mailbox is necessarily made by a telephonic device, which is either fixed or mobile.

The greeting message can most often be personalised by the users subscribing to the services of the telephony operator offering the voice mail service. This personalisation is done by each subscribing user. To personalise his voice mailbox greeting message, a user set up a connection, through the telephony network, with his voice mailbox. Once the connection has been set up, the user must generally use his telephone keypad to inform the voice mail or messaging server that he wishes to parametrize his voice mailbox. The server then goes into recording mode. The user can then enunciate his greeting message which is recorded by the server. Once the recording is over, the user presses a key. This means that he has completed his greeting message. The server then sends the user the greeting message that he has just prepared, through the telephony network. This enables the user to judge the appropriateness of his greeting message. If the user is satisfied, he cuts off the connection with the voice mail server. If not, he uses the keypad of his terminal to record another greeting message.

This type of interface with the voice mail server presents several problems. A first problem relates to the obligation to use a telephony terminal compatible with the voice mail server of which the user is a subscriber.

Another problem is that the type of data transmitted to the voice mail server is limited by the capacities of acquisition and instantaneous transmission of the apparatus used to personalise the greeting message of the voice mailbox. In the prior art, the parametrizing technique is performed in a voice mode connection. The only information that can be transmitted then is the user's voice and possibly tones in the DTMF mode if the terminal being used can manage such transmission. In particular, it is impossible to transmit text or images, whether still or moving.

Yet another problem is that, during the recording of the greeting message and its validation, the terminal is connected to the voice mail server. This connection takes up network resources which can no longer be allocated to other users wishing to make a standard call. This also prevents the user from receiving a call from a person wishing to reach him at a time when, furthermore, his voice mailbox is not properly parametrized and therefore not in a position to receive voice messages. This problem is especially critical because a message can take one minute or more in addition to the procedure for recording it and because the first recording attempt is rarely the right one. It therefore frequently happens that ten minutes or more are needed to personalise a user's voice mailbox. This is detrimental both to the user and to the operator. The resources referred to herein are chiefly voice communications and data resources and exclude signalling and network management resources. For these latter resources, the problem exists but is less important.

The invention resolves these problems by personalising a mail service or voice mailbox through a preformatted multimedia message of the MMS (Multimedia Messaging Service) type. The user produces a message in the predefined format on an apparatus that may be a mobile telephony terminal, a personal computer or any other type of apparatus. This apparatus comprises a program enabling the user to produce a preformatted message containing all the details set beforehand. These details include at least one identifier of the user, and voice data corresponding to the greeting message. These details are inserted in an MMS message which is sent, for example by Internet, to the voice mail server. The message can also be sent to a server capable of parametrizing the voice mail server. In the invention, the resources of the network are called upon only for the transmission of the personalisation message and after the production of the greeting message by the user. Compression methods can therefore be used for the greeting message, further reducing the need to call upon the communications resources of the network. Similarly, data pertaining to still or moving images can be incorporated into the personalisation message. Upon the reception of the personalisation message, the voice mail server extracts the information that it needs from this message in order to get parametrized according to the user's requirements.

SUMMARY IF THE INVENTION

An object of the invention therefore is a method for parametrizing the greeting message of a voice mailbox comprising the following steps:

a user records a greeting message at a terminal, the greeting message is compressed at the terminal, a multimedia message comprising the compressed greeting message is produced at the terminal, the multimedia message comprises an instruction field to indicate that it is a greeting message, the multimedia message is sent from the terminal to a greeting message server.

An object of the invention is also a method for the parametrizing of the greeting message of a voice mailbox, characterized in that the method comprises the following steps:

an instruction field, indicating the fact that the multimedia message is a message for updating the greeting message, is received at a greeting message server, the sender of the multimedia message is determined at the greeting message server, the greeting message is extracted from the greeting message server, the greeting message is recorded in a database in being made to correspond, in the database, to the sender of the multimedia message.

BRIEF DESCRIPTION OF THE DRAWINGS

The invention will be understood more clearly from the following description and the accompanying figures. These figures are given purely by way of an indication and in no way restrict the scope of the invention. Of these figures.

DETAILED DESCRIPTION OF THE PREFERRED EMBODIMENT(S)

Figure 1:
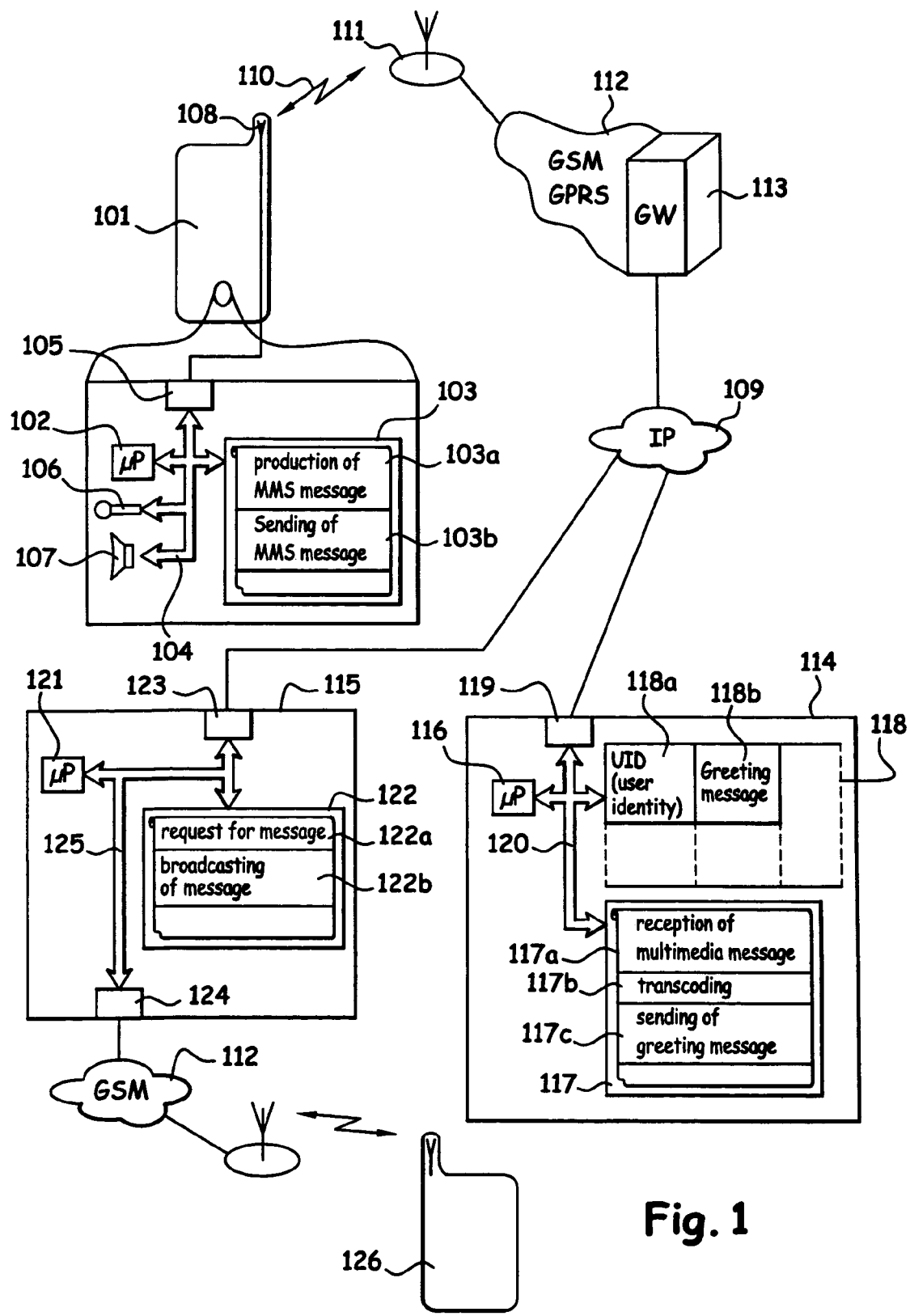
FIG. 1 is an illustration of means that can be used to implement the method according to the invention.

FIG. 1 shows an apparatus 101 which, in the present example, is a mobile telephone. In practice, the apparatus 101 could be a personal computer, an electronic personal digital assistant or any apparatus likely to get connected to a greeting message server to send it a personalisation message.

The telephone 101 comprises at least one microprocessor 102 and one program memory 103. The program memory 103 comprises several zones, each zone comprising instruction codes enabling the implementation of a function of the apparatus 101. These instruction codes are interpreted by the microprocessor 102. Thus, when an action is attributed to an apparatus, this action is performed by a microprocessor of the apparatus, said microprocessor executing instruction codes recorded in a program memory of the apparatus.

The memory 103 comprises a zone 103a comprising instruction codes for the production of an MMS message according to the invention, and a zone 103b comprising instruction codes for the sending of an MMS message. The memory 103 and the microprocessor 102 are connected through a bus 104.

The telephone 101 also comprises interface circuits 105 between the bus 104 and an antenna 108 of the telephone 101. The telephone 101 also comprises a microphone 106 and a speaker 107. The means 105 to 107 are connected to the bus 104. The means 106 and 107 are classic means of a mobile telephone. They are shown only in order to illustrate the fact that a mobile telephone comprises all the means that can be used for the acquisition and restitution of sounds.

Conventionally, the telephone 101 is capable of getting connected to an Internet type network 109 through a wireless type connection 110 between the antenna 108 and a base station 111. The base station 111 belongs to the infrastructure of a GSM/GPRS (or UMTS) network comprising a gateway 113 between the network 112 and the network 109. This gateway is typically a WAP gateway.

Through the network 109, it is also possible to link up to a greeting message server 114 and a voice mail server 115. For the description, we have separated the functions of the greeting message server and of the voice mail server by dividing them between two apparatuses. In practice, it is possible to have only one apparatus implementing both functions.

The server 114 has a microprocessor 116, a program memory 117, a greeting message memory 118 and circuits 119 for interfacing with the network 109. The elements 116 to 119 are connected through a bus 120.

The memory 117 has at least one zone 117a comprising instruction codes for the reception of multimedia messages, one zone 117b comprising instruction codes for the transcoding of the multimedia messages, and one zone 117c for sending greeting messages. The transcoding of a multimedia message consists of the extraction of the different multimedia components of the message.

The memory 118 is a table divided into rows and columns. Each row corresponds to a user identified by an identifier recorded in the column 118a. Each identifier then has a corresponding greeting message recorded in a column 118b. The memory 118 may comprise other columns enabling the association of other information (images, video, visiting cards etc.) with a user. The memory 118 illustrates the fact that the server 114 has means to associate information, including a greeting message, with a user identifier.

The server 115 comprises at least one microprocessor 121, one program memory 122, interface circuits 123 for interfacing with the network 109 and interface circuits 124 for interfacing with the network 112. The elements 121 to 124 are connected through a bus 125.

The memory 122 has at least one zone 122a comprising instruction codes to obtain a greeting message, and one zone 122b comprising instruction codes to broadcast a greeting message. The greeting message is broadcast to a person P seeking to reach the user of the telephone 101 at a time when the telephone 101 can no longer be reached. The person P, using a telephone 126, is then connected to the voice mail server 115.

Figures 2, 3:
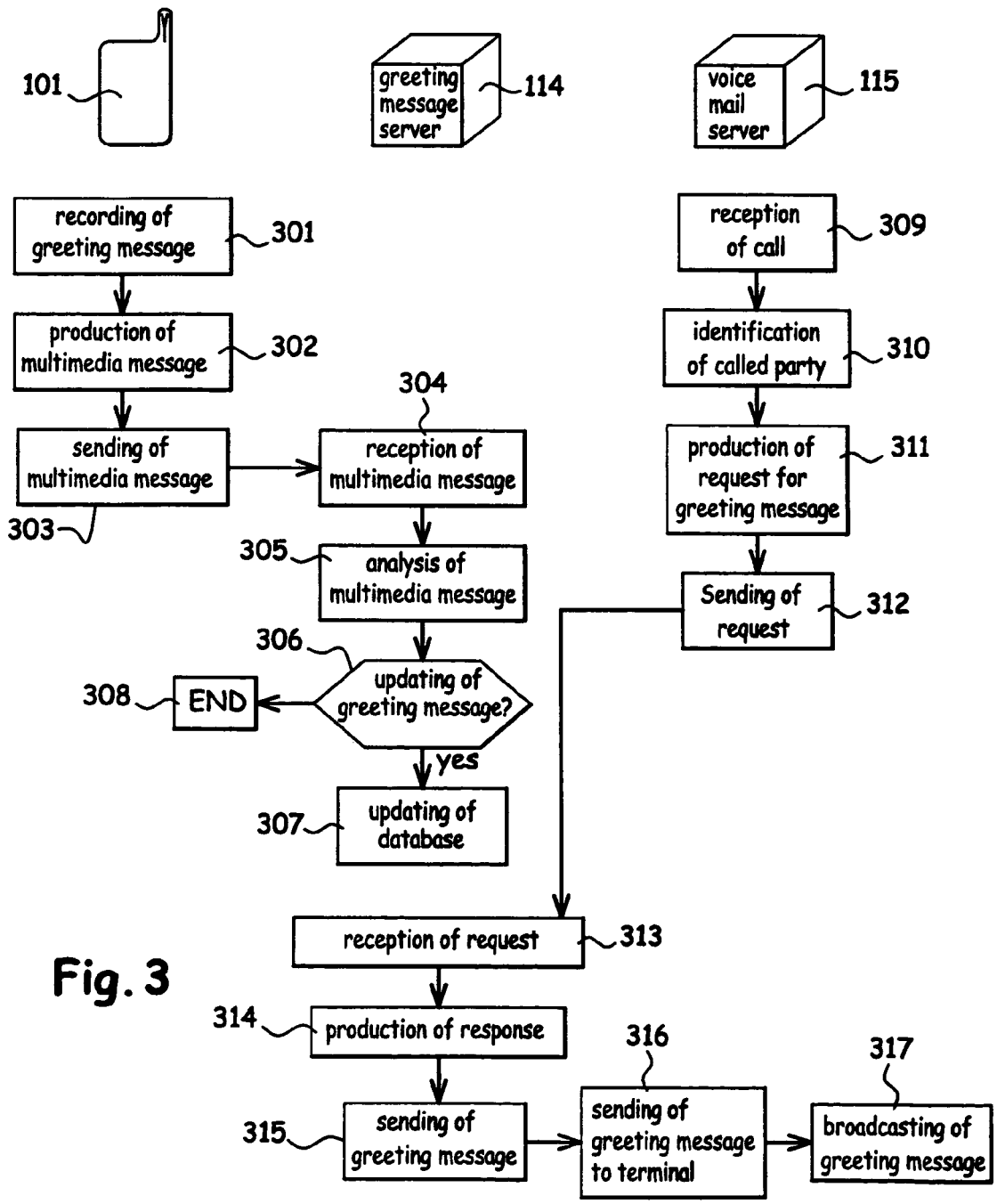
FIG. 2 illustrates a personalisation message according to the invention.
FIG. 3 illustrates steps of the method according to the invention.

FIG. 2 illustrates the possible structure for a personalisation/configuration message according to the invention. Such a message 200 comprises an instruction field 201 by which the message can be identified as a personalisation message, a field 202 enabling the identification of a person as well as a voice mailbox to be personalised and a field 203 comprising the greeting message. This structure is known to all the apparatuses forming part of the personalisation. This enables the fields to be interpreted accurately. One possible solution that can be used to determine the fields consists in defining a field separator, or using fields with a fixed and known length, or using a mark-up system as prescribed by the MMS recommendation implementing the XML (extended Language Markup) syntax.

| Example of a personalisation message |
| --- |
| 01     <?xml version="1.0" encoding="ISO-8859-1"?> |
| 02     <message type="maj mes acc"> |
| 03        <idu>06 12 34 56 78</idu> |
| 04        <mes type="codage">0111011...0101</mes> |
| 05     </message> |

The above example illustrates a possible syntax in the context of an implementation using the XML mode. The line 01 of the example corresponds to a specific feature of the XML standard. The line 02 defines a message whose type is "maj mes acc". This is an instruction code, corresponding to the field 201, indicating that this is a message for updating a greeting message. The line 03 corresponds to the field 202 identifying the user whose greeting message must be updated. The line 04 corresponds to the greeting message between two tags, the type of encoding being specified in the opening tag. The line 05 is the closing tag, according to the XML syntax, corresponding to the line 02. It can be seen that the XML syntax of the example is given as an indication. The name of the tags as well as the indentation of the text, and information on type could be positioned and named differently. Similarly, the XML/MMS syntax is not the only one possible. Other types of syntax are known. These include the SGML, HTML and other types of syntax and binary structures enabling the fields to be instantiated.

In one variant, a message to update the greeting message may contain information other than that necessary for the updating of the greeting message. Such information may be a photograph of the user, or information on the general parametrizing of the user's subscription. In this case, it is the message for the updating/configuration of the greeting message that is contained in a general configuration message comprising at least the fields described for the FIG. 2.

FIG. 3 shows a preliminary step 301 during which the user of the telephone 101 uses an apparatus to produce a greeting message. In the present example, the apparatus is considered to be the telephone 101. In practice, it could be a personal computer, a personal digital assistant, or any other apparatus having a recording capacity. During the step 301, the user records a message through the microphone 106. This message is recorded in a memory of the telephone 101 in the form of an audio file. The format of this audio file is preferably compressed for example in the MP3 format or any other MPEG format. In one variant, this file may very well be a video file. To enable the production of a video file, the telephone 101 must either be connected to a video camera or include a video camera. Once the audio file has been produced, the invention passes to a step 302 for the production of the multimedia message.

In the step 302, the telephone 101 puts the information on the updating of a greeting message into shape. This means producing a message having the structure described for FIG. 2, and/or the structure described for the exemplary XML syntax. The instruction code used to enter information into the field 201 is predefined and included, for example, in the instruction codes of the zone 122a. The user identifier is, for example, a telephone number. This identifier is either entered at the step 302 by the user of the telephone 101, or read automatically in a SIM card of the telephone 101, or updated automatically by the network. The field 203 for its part is provided with information from the audio and/or video file obtained at the step 301. Thus, a message for the configuration of a voice mailbox is received. The step 302 is followed by a step 303 for sending the configuration/updating message.

In the step 303, the multimedia message 200 produced at the step 303 is packaged in a message according to a protocol known as a transport protocol. Such a protocol is, for example, the TCP/IP, HTTP, FTP or other protocol. In addition to the updating message 200, this transport protocol message comprises at least one address of a recipient. In the present example, this recipient is the server 114 of the greeting message appended through the Internet 109. The transport protocol message is conveyed through the network 112, the gateway 113 and the Internet 109. The address of the server 114 is obtained in a classic way, either (a) because it is encoded in the zone 103b or another memory zone of the telephone 101, or (b) by means of a DNS type address resolution. There are other transport protocols such is the UDP or X25 protocols used to send a configuration message from the telephone 101 to the server 114. It will be seen that, in one variant, the telephone 101, during the step 303, updates the field 202 as a function of an identifier communicated by the network 112. This updating can also be done by the server 113 which forms part of the network 112.

In the step 304, the server 114 receives a transport message. The server 114 rids this message of the information layers corresponding to the transport protocols used and obtains a configuration message such as the one described for FIG. 200 and/or the exemplary XML syntax. The next step of the method is a step 305 for the analysis of a multimedia message.

In the step 305, the server 114 has access to the fields of the message 200. Having access, the server 114 can determine the nature of the message received through the transport message. In a step 306, following the determining of the nature at the step 305, the server 114 analyses the value of the field 201 to determine whether the message that it has just received is an updating message. The possible values for the field 201 are defined according to the different types of message that can be processed by the server 114. Such values are either numerical or alphanumerical, or quite simply binary.

In the step 306, the value read at the step 305 for the field 201 is therefore compared with the list of values expected by the server 114 for the field 201. If the value read corresponds to the value of the instruction code for updating the greeting message, the method of the invention passes to an updating step 307. If not, it passes to an END step 308.

In the step 308, the server continues its operations for processing the message. These operations no longer concern the messages according to the invention.

In the step 307, the server 114 makes a search in the memory 118 for the row in which the value of the column 118a corresponds to the value of the field 202 of the configuration message received at the step 304. Once this row has been found, the server replaces the numerical contents of the column 118b of this row by the numerical contents of the field 303 of messages received at the step 304. If the row is not found, then either it is created or the updating message is ignored.

It is possible that the format of the greeting message recorded in the memory 118 is not the same as the one used for the field. This format is optionally specified in the field 203 as was seen for the XML example. This enables the server, if necessary, to perform a transcoding operation before recording the new greeting message in the memory 118. It can be noted here that the memory 118 is a simplified representation of the database.

In the variant in which the message 200 forms part of a general configuration message, everything happens as described here above for the steps 304 to 307 except that, since the message comprises other information, other zones of the memory 118 are updated.

In another variant, it is possible that a user may have several greeting messages whose use depends on circumstances or on the caller. In this case, a configuration message comprises as many fields of the 203 type, or as many lines such as 4 in the XML example, as there are greeting messages to be configured. Each greeting message is then accompanied by a piece of information specifying its particular characteristics and enabling the server 114 to store it accurately with a view to its subsequent appropriate re-utilisation.

FIG. 3 shows a step 309 for the reception of a call by the voice mail server 115. This situation arises either when a subscriber is unreachable or when someone calls a voice mailbox directly. In the present example, the call is deemed to be sent from the telephone 126 to the telephone 101, which is then unreachable.

From the step 309, the invention goes to a step 310 for the identification of the called party by the server 115. This identification is easy because the call is always conveyed through a protocol enabling the identification of the person who is being called. In general, the identifier is his telephone number. This identifier is also transmitted to the voice mail server which must be capable of assigning the messages left by the users, who get linked up to the server 115, to the subscribers. The server 115 is therefore in possession of an identifier of the called party, classically his telephone number. The method then passes to a step 311 for the production of a request, herein called a message R, to obtain the greeting message corresponding to the called party.

In the step 311, the server 115 produces the request message R comprising an instruction codes indicating that this is a request to obtain a greeting message, and an identifier I of the user. In one variant, the message R also has a field to identify the caller. Once this message R has been produced, it is sent, in a step 312 and through a transport protocol, to the server 114.

In a step 313, the server 114 receives the message sent at the step 312. The server 114 rids this message of the transport information and obtains the message R. The server 114 identifies this message R through the instruction code field contained in the message R. The method then goes to a step 314 for the production of a response to the message R.

In the step 314, the server 114 scans the memory 118 and especially the column 118a in search of the identifier I of the message R. Once the row corresponding to the identifier I is found, the server 114 uses the numerical contents of the column 118b to produce a response to the message R. These numerical contents form a greeting message. The response RR to the message R therefore comprises at least this greeting message that has been found. The response RR also comprises a field II identical to the field I that makes it possible to determine the associations attached to the greeting message. The role of the field II is to enable the server 115 to associate the response RR with the message R. The response R may also comprises an instruction code indicating the type of response RR, which is a response to a request for a greeting message.

The message R may comprise more information used to determine the appropriate greeting message if the called subscriber should have planned for several greeting messages. The appropriate greeting message may also be determined as a function of the time at which the message R is received.

When the response RR is produced, it is sent, in a step 315, to the server 115. The transport protocol used for this sending operation is preferably the same as the one used for the sending of the message R. The response RR is therefore sent through the network 109. In practice, the communications between the server is 114 and 115 may very well be made through a private network and/or a network using technologies other than the ones used on the Internet. These include, for example, local area networks, direct communications through a USB port and wireless networks: this list is not exhaustive. In one variant, the servers 114 and 115 are one and the same apparatus. In this case, there is no need whatsoever to make them communicate with each other because the single server then contains the contents of the memories 117, 118 and 122.

In a step 316, the server 115 receives a response RR. The server 115 then possesses a greeting message which it can send to the telephone 126. This sending is preferably done classically, that is, the greeting message is decompressed by the server 115 and broadcast acoustically to the telephone 126. In one variant, the greeting message is sent like an audio file to the telephone 126 which is then responsible both for its decompression and its acoustic rendering.

In a step 317, the telephone 126, connected to the server 115, receives information from this server corresponding to greeting message. This information is processed by the telephone 126 and broadcast acoustically through a speaker of this telephone.

In the description, the apparatus 101 has hitherto been considered to be a mobile telephone. In practice, it is also possible to use a personal computer capable of recording an audio file, namely a computer that is provided with a microphone and can implement a program for composing a multimedia message from the audio file. This composition program corresponds to the instruction codes of the zone 103a. The same computer must also be connected to the Internet so that it can send the composed message to the server 114. Reference has been made to a personal computer but any pocket computer or personal digital assistant would be suitable.

What is claimed is:

1. A method for parametrizing a greeting message of a voice mailbox characterized in that it comprises the following steps:
    a first user records a greeting message at a first terminal,
    the greeting message is compressed at the first terminal,
    a multimedia message comprising the compressed greeting message is produced at the first terminal,
    the multimedia message comprises an instruction field to indicate that it is a greeting message,
    the multimedia message is sent from the first terminal to a greeting message server,
    a second user gets connected, through a second terminal, to a voice mail service of a voice mail server,
    a request is sent from the voice mail server to the greeting message server, the request comprising a called user identifier,
    the greeting message in a database corresponding to the called user identifier is sent, from the greeting message server and to the voice mail server,
    the greeting message is sent from the voice mail server and to the second terminal,
    the greeting message is sent out acoustically to the second terminal.

2. A method according to claim 1, characterized in that the multimedia message is formatted according to an XML type message.

3. A method according to claim 1, characterized in that the multimedia message comprises a field identifying the user producing the greeting message.

4. A method according to claim 1, characterized in that the multimedia message comprises a piece of format information for the greeting message.

5. A method for the parametrizing of a greeting message of a voice mailbox, characterized in that the method comprises the following steps:
    an instruction field, indicating the fact that the multimedia message is a message for updating the greeting message, is received at a greeting message server,
    the creator of the multimedia message is determined at the greeting message server,
    the greeting message is extracted from the greeting message server,
    the greeting message is recorded in a database, the greeting message being made to correspond, via a called user identifier in the database, to the creator of the multimedia message, a user gets connected, through a terminal, to a voice mail service of a voice mail server, a request is sent from the voice mail server to the greeting message server, the request comprising the called user identifier, the greeting message in the database corresponding to the called user identifier is sent, from the greeting message server and to the voice mail server, the greeting message is sent from the voice mail server and to the terminal, the greeting message is sent out acoustically to the terminal.

6. A method according to claim 5, characterized in that the greeting message is transcoded, before recording, as a function of the format used by the greeting message server and as a function of a piece of information on format included in the multimedia message.

7. A method according to claim 1, characterized in that the terminal is a mobile telephone.

8. A method according to claim 1, characterized in that the terminal is a computer.

* * * * *